(12) United States Patent
Polsky et al.

(10) Patent No.: US 9,533,887 B1
(45) Date of Patent: Jan. 3, 2017

(54) PATTERNED STRUCTURES OF GRAPHENE AND GRAPHITIC CARBON AND METHODS FOR THEIR MANUFACTURE

(71) Applicant: Sandia Corporation, Albuquerque, NM (US)

(72) Inventors: Ronen Polsky, Albuquerque, NM (US); Xiaoyin Xiao, Albuquerque, NM (US); David Bruce Burckel, Albuquerque, NM (US); David R. Wheeler, Albuquerque, NM (US); Susan M. Brozik, Albuquerque, NM (US); Thomas Edwin Beechem, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 791 days.

(21) Appl. No.: 13/790,524

(22) Filed: Mar. 8, 2013

(51) Int. Cl.
*B05D 5/00* (2006.01)
*C01B 31/04* (2006.01)

(52) U.S. Cl.
CPC ........... *C01B 31/04* (2013.01); *C01B 31/0446* (2013.01)

(58) Field of Classification Search
CPC .................................................... C01B 31/04
See application file for complete search history.

(56) References Cited

U.S. PATENT DOCUMENTS 8,349,547 B1    1/2013    Burckel et al.

OTHER PUBLICATIONS

Chen et al., "Three-Dimensional Flexible and Conductive Interconnected Graphene Networks Grown by Chemical Vapour Disposition," Nat. Mater. 2011, 10, pp. 424-428.
Peng et al., "Direct Growth of Bilayer Graphene on $SiO_2$ Substrates by Carbon Diffusion Through Nickel," ACS Nano 2011, 5, pp. 8241-8247.
Xiao et al., "Lithographically Defined Three Dimensional Graphene Structures", ACS Nano. 6(4) Apr. 24, 2012, Epub Mar. 22, 2012; pp. 3573-3579.
Xiao et al., "Three dimensional nickel-graphene core-shell electrodes", J. Mater. Chem., 2012 22, pp. 23749-23754 (Dec. 7, 2012).
Sun, Hong-Bo and Kawata, Satoshi, "Two-Photon Photopolymerization and 3D Lithographic Microfabrication", in NMR, 3D Analysis, Photopolymerization, Advances in Polymer Science Series, vol. 170, Springer-Verlag 2004; pp. 169-273.
Yan et al., "Growth of Bilayer Graphene on Insulating Substrates," ACS Nano 2011, 5, pp. 8187-8192.

*Primary Examiner* — Xiao Zhao
(74) *Attorney, Agent, or Firm* — Martin L. Finston

(57) ABSTRACT

A patterned graphene or graphitic body is produced by providing a three-dimensionally patterned carbonaceous body; coating the body with a catalytic metal whereby is formed a coating having an inner surface proximal the body and an outer surface distal the body; and annealing the coated body under time and temperature conditions effective to form a graphene or graphitic layer on the outer surface of the catalytic metal coating.

8 Claims, 8 Drawing Sheets

US 9,533,887 B1

PATTERNED STRUCTURES OF GRAPHENE AND GRAPHITIC CARBON AND METHODS FOR THEIR MANUFACTURE

STATEMENT OF GOVERNMENT INTEREST

This invention was developed under Contract DE-AC04-94AL85000 between Sandia Corporation and the U.S. Department of Energy. The U.S. Government has certain rights in this invention.

TECHNICAL FIELD

This invention relates to the transformation of structures into graphene or graphitic carbon and to structures so transformed.

ART BACKGROUND

Elemental carbon is known to have many allotropes, such as diamond, graphite, the buckminsterfullerenes, and graphene. Graphene, in particular, has been receiving increasing attention for potential practical application of its special electronic and thermal transport properties. Graphene is one example of a carbon allotrope that is substantially characterized by a two-dimensional lattice of $sp^2$-bonded carbon atoms. In our terminology, monolayers and bilayers of $sp^2$-bonded carbon atoms are, respectively, "monolayer" and "bilayer" graphene. As further layers are added, the physical properties of these materials are known to progressively become less characteristic of graphene and more characteristic of bulk graphite. Accordingly, we refer to $sp^2$-bonded carbon structures of multiple layers, generally five to ten layers, as "graphitic" carbon.

Numerous methods have been reported for preparing graphene films. These include cleavage of highly oriented pyrolytic graphite, reduction of graphite oxide, thermal decomposition of silicon carbide, chemical vapor deposition, and segregation using nickel and copper catalysts. In particular, a nickel catalyst has been used in conjunction with sacrificial carbon sources such as PDMS, PMMA, and polystyrene to produce bilayer graphene films, as reported, e.g., by Z. Yan et al., "Growth of Bilayer Graphene on Insulating Substrates," *ACS Nano* 2011, 5, 8187-8192 and Z. Peng et al., "Direct Growth of Bilayer Graphene on $SiO_2$ Substrates by Carbon Diffusion through Nickel," *ACS Nano* 2011, 5, 8241-8247. In that process, a nickel coating encapsulates the carbon source, which is then annealed. The carbon atoms diffuse through the metal film to form the bilayer graphene film. Such a process, however, might be limited in its ability to produce complex structures of graphene, especially complex three-dimensional structures.

Fabrication of three-dimensional graphene structures using a template-directed chemical vapor deposition (CVD) process has been reported by Z. Chen et al., "Three-Dimensional Flexible and Conductive Interconnected Graphene Networks Grown by Chemical Vapour Deposition," *Nat. Mat.* 2011, 10, 424-428. As reported there, graphene films are precipitated on a three dimensional scaffold of nickel foam, which is subsequently removed by etching. Such a process might also be limited in the kinds of structures that it can achieve in graphene.

Accordingly, there remains a need for further techniques for forming objects from $sp^2$-bonded carbon, including graphitic carbon, and especially for forming three-dimensional objects from graphene films.

SUMMARY OF THE INVENTION

We have developed such a technique. According to our new technique, a pattern is created from a sacrificial carbon source. The pattern may, for example, be a three-dimensional structure. In an embodiment, the pattern is sputter-coated with a catalytic metal such as nickel or copper. The coated pattern is then annealed at a sufficient temperature, and for sufficient time, for carbon from the pattern to diffuse through the metal coating and grow into a graphene or graphitic carbon layer. Optionally, the metal coating is then removed by etching.

In embodiments, the pattern is a three-dimensional structure made of porous carbon, which in that or other embodiments has been shaped by, e.g., interference lithography. We believe that using our technique, a pyrolyzed carbon pattern of any shape that can be defined through lithographic techniques can be used to make a corresponding graphene structure, and that such a technique will therefore be useful for making, among other things, three-dimensional graphene bodies having linear, spiral, and other symmetric and asymmetric shapes.

We note that although particularly useful, as will be seen below, pyrolyzed carbon is only one of numerous carbonaceous materials that will be useful as source materials for the pattern.

BRIEF DESCRIPTION OF THE DRAWINGS

FIGS. 6A and 6B are secondary electron images. FIG. 6C is a backscattered electron image.

DETAILED DESCRIPTION

Figure 1:
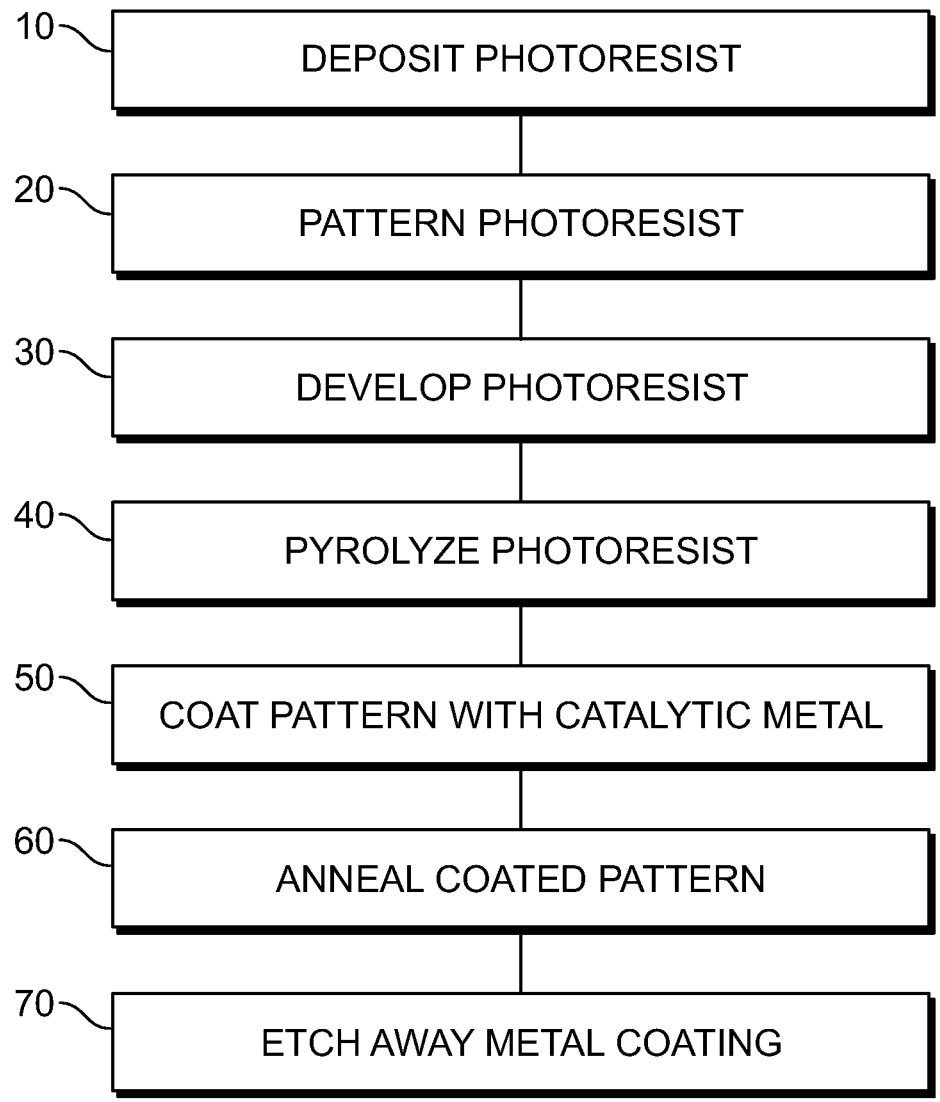
FIG. 1 is a flowchart of an illustrative procedure for making a graphene or graphitic carbon article.

FIG. 1 is a flowchart of an illustrative procedure for making a graphene or graphitic carbon article. Steps 10-40 as seen in the figure are directed to the formation of the sacrificial carbon pattern. In one example, the pattern is composed of porous, glassy carbon obtained by annealing one or more photoresist layers to produce one or more pyrolyzed photoresist films (PPFs). A process for producing lithographically defined carbon structures by way of PPFs is described, for example, in U.S. Pat. No. 8,349,547 which issued to D. B. Burckel et al. on Jan. 8, 2013, the entirety of which is hereby incorporated by reference herein.

In Step 10, a carbonaceous, i.e., carbon-rich, photoresist is deposited on a substrate of, e.g., silicon. Many different photoresists will be suitable for this purpose. It should be noted in this regard that any of various other photopatternable materials may be used in place of the photoresist.

By way of example, we have successfully used photoresists in the NR7 product family from Futurrex Inc. of Franklin, N.J. In Step 20, the resist is lithographically patterned. By way of example, as reported in U.S. Pat. No. 8,349,547, we have patterned an NR7 resist using two-beam interferometric lithography, which is a maskless approach in which coherent plane waves are combined to form an interference pattern that is recorded in the resist. Because it is maskless, this technique is useful for volumetric exposures that can lead to the creation of three-dimensional structures. In Step 30, the patterned resist is developed. Although not explicitly indicated in the figure, we note that multiple layers can be built up by repeating Steps 10-30.

In Step 40, the developed photoresist is pyrolyzed to provide a carbon structure. As noted, the resulting carbon composition will typically be glassy carbon, which generally consists primarily of amorphous $sp^3$-bonded carbon, possibly with a small admixture of $sp^2$-bonded carbon.

Pyrolysis may be performed, for example, in a tube furnace with flowing forming gas of exemplary composition hydrogen (5%), nitrogen (95%). In the pyrolysis of the developed NR7 resist reported in U.S. Pat. No. 8,349,547, the pattern was heated to 1050 C at a ramp rate of 5 C per minute, and maintained isothermally for one hour before cooling to room temperature at a similar ramp rate.

It should be understood that the example of Steps 10-40 for providing a sacrificial carbon pattern are illustrative and not limiting, as numerous alternative procedures will be readily apparent for providing suitable carbon patterns. For example, patterns may be created using the techniques of stereolithography. In other examples, patterns may be created by the one-time or repeated application of photoresist, or other carbonaceous materials, to non-planar objects serving as substrates. Alternative carbonaceous substrate materials include, without limitation, stereolithographic photopolymers and organic hydrogels.

Details of Steps 10-40, as exemplarily applied for the creation of microporous carbon structures suitable for use as electrochemical electrodes may be found in the above-cited U.S. Pat. No. 8,349,547.

In Step 50, the pattern is coated with catalytic metal. By "catalytic metal" is meant a metal that catalyzes the formation of graphene. Known catalytic metals include nickel, copper, and ruthenium. We note that carbon is more soluble in nickel and ruthenium than in copper, and that catalytic coatings of nickel and ruthenium are known to produce thicker multilayer graphene films than copper for that reason.

A nickel coating may be applied, for example, by a conventional sputtering process. By way of example, we successfully fabricated a nickel and graphene core-shell electrode by sputter-coating a patterned PPF with nickel at a rate of about 0.7 Å per second for 2600 seconds, followed by further processing as described below. In Step 60, the coated pattern is then annealed. During the anneal, carbon atoms from the pattern diffuse to the opposite side of the metal coating, where they spontaneously crystallize as a graphene film. (For higher exposures, we expect that the diffused carbon will form a graphitic carbon film.) By way of example, to form our core-shell electrode we annealed in forming gas at 750 C for 50 minutes.

In Step 70, the metal coating is removed by etching. By way of example, we removed the nickel coating from our core-shell electrode by etching in 2 Molar sulfuric acid for eight hours. Of course if retention of the metal coating is desired, the etching step may be omitted, or it may be terminated after partial removal of the metal.

In an example provided below, the method of FIG. 1 is used to produce porous, multilayer, graphene films that are suitable for use as electrochemical electrodes. Numerous other applications are possible, for example in photodetectors, in devices utilizing phononic crystals, and in thermoelectric devices and devices using passive heat transport. Another possible application is in electronic relays, in which electrical contacts may be made by three dimensional structures that include graphene wires or crossbars. Such structures may be made, for example, by growing a graphene body on a substrate as described above, separating the body from the growth substrate, and transferring it to the final device substrate. A three-dimensional graphene body may also be grown directly between two contacts for use as an electrical wire, or as a gate for a three-dimensional field-effect transistor, among other things.

EXAMPLE 1

Figure 2:
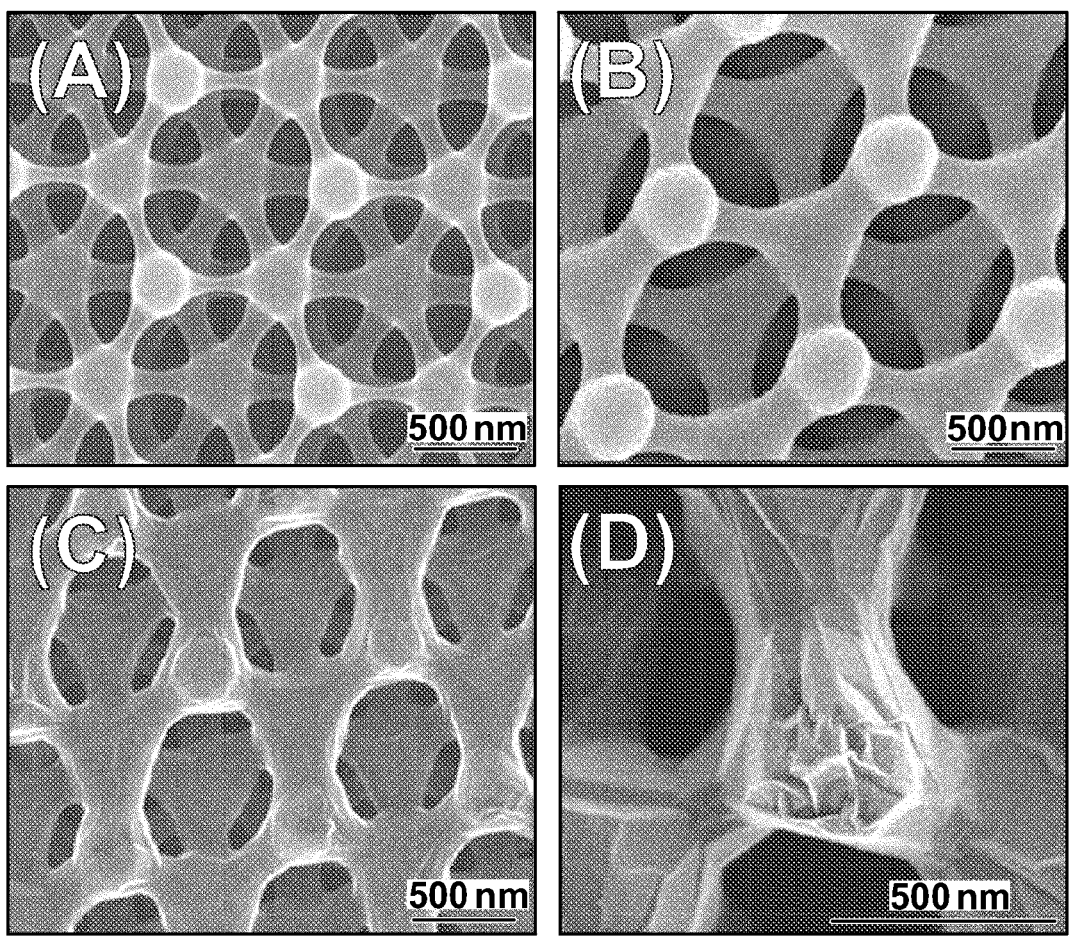
FIG. 2A is a scanning electron micrograph of a pattern of three-dimensional porous carbon created by interference lithography.
FIG. 2B is a scanning electron micrograph of a smooth coating of nickel sputtered onto porous carbon before thermal annealing.
FIGS. 2C and 2D are scanning electron micrographs of polycrystalline graphene structures produced by annealing the structure of FIG. 2B.

Interference lithography was implemented to create a pattern of three-dimensional porous carbon with approximately face-centered cubic structure as seen in the scanning electron micrograph of FIG. 2A. The structures consisted of five interconnected layers with nanometer-sized carbon arms and nodes arranged in a triangular in-plane structure. The arms may, for example, have diameters of about 20-50 nm and the nodes may, for example, have diameters of about 200 nm. We note that electrodes formed from three-dimensional porous carbon are of particular interest because they are known to yield increased mass transport of fuels and analytes (measured electrochemically) due to hemispherical diffusion profiles inside the structures.

The procedure for making the pattern was essentially as described in U.S. Pat. No. 8,349,547. Briefly, formation of a microporous carbon structure begins with deposition of a carbon-containing photoresist onto a substrate. First, a thin i-line anti-reflection coating (i-CON®-7, Brewer Science) was spun onto a plasma-cleaned silicon wafer and baked on a vacuum hotplate at 205 C for 60 seconds. Then, an adhesion thin layer (about 100 nm) of negative resist NR7-100P was deposited and spun onto the anti-reflection coating at 3000 RPM. The adhesion layer was cross-linked by a flood exposure and post-exposure baked at 130 C on a vacuum hotplate. Then, a thick layer (e.g., about 6 μm) of NR7 was spun onto the substrate at 3000 RPM and soft baked at 130 C for 120 seconds on a vacuum hotplate.

A porous structure was then defined in the photoresist by two-beam interferometric lithography. Three separate two-beam exposures were used with the two laser beams maintained in a fixed relative position, with an in-plane sample rotation of 120 degrees between exposures. The frequency-tripled 355 nm line of a Q-switched Nd:YAG laser was used to form the inference pattern by i-line lithography. The laser beam was expanded and split into two separate beams and interfered with an angle of 32 degrees between the plane-wave propagation vectors. The plane of incidence contained both propagation vectors as well as the angle bisector of the propagation vectors. The angle-bisector was tilted with respect to the sample surface normal by 45 degrees. After each exposure, the sample was rotated in the plane by 120 degrees and the process repeated a total of three times. The spacing between the high intensity regions of the interference pattern used to expose the resist was controlled by the angle of incidence between the interfering beams.

The pattern formed by the lithographic exposure was a three-dimensional honeycomb pattern having pore sizes of about 600-800 nm. Using this process, we believe that average pore sizes in the final graphene or graphitic product that are of micrometer scale or above are readily achievable, as well as average pore sizes on a much finer scale, such as average pore sizes in the range 50-1000 nm.

The lithographically defined photoresist structure was then developed. The exposure geometry resulted in a volumetric interference pattern which caused cross-linking in the thick negative resist in regions of high intensity. A post-exposure bake of 85 C for 2 minutes on a vacuum hotplate was used to complete the cross-linking process in the exposed regions. The fabrication of the exposed negative resist structure was completed with a puddle development using resist developer RD6 (Futurrex, Inc.) and spin drying the developed photoresist.

The conversion to graphene was accomplished by first sputtering nickel at 0.5 Å per second for 20 minutes (1200 seconds). FIG. 2B shows a smooth coating of nickel on porous carbon before thermal annealing. The open porous configuration of these structures resulted in complete film coatings down to bottom layers (including undersides) after sputtering.

Annealing was performed at 750 C in a 5%/95% $H_2/N_2$ atmosphere for 50 minutes. Then, the nickel layer was etched in 2 Molar sulfuric acid for eight hours.

This process produced a three-dimensional graphene structure. The wrinkles and ripples seen in FIGS. 2C and 2D are typical and characteristic of polycrystalline graphene structures.

Figure 3:
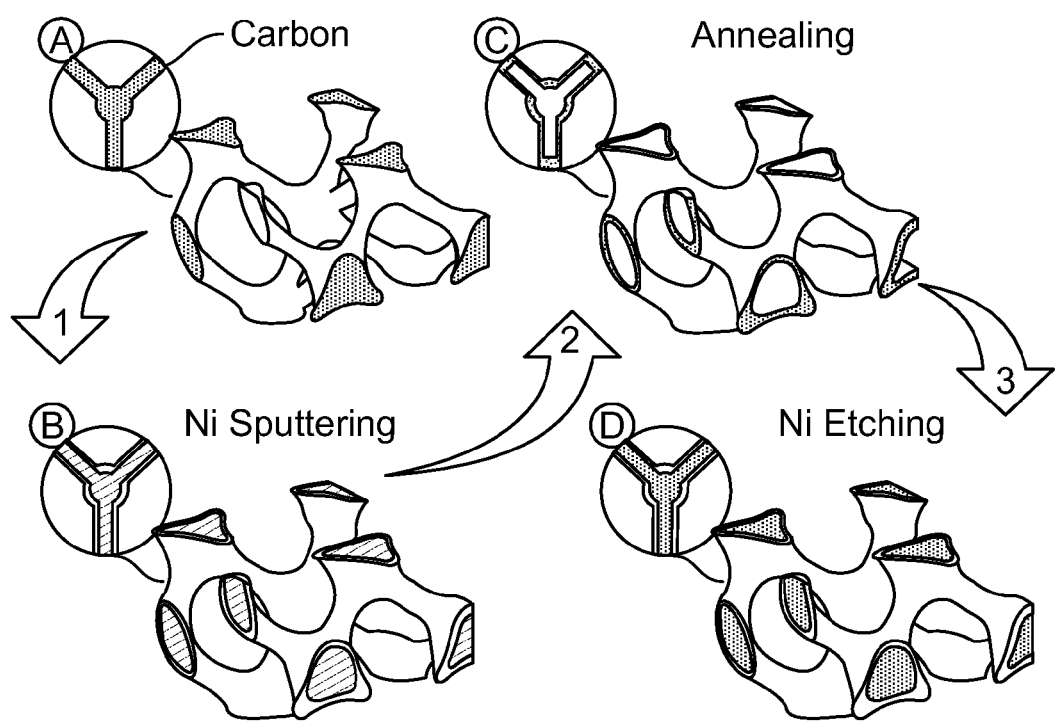
FIG. 3 is an idealized graphical depiction of a portion of the carbon structure at various stages of the processes represented by the preceding figures. The specific stages illustrated are: (A) porous carbon, (B) conformal Ni coating, (C) diffusion of carbon into Ni top surface during thermal annealing, and (D) hollow three-dimensional graphene after etching away of the nickel.
Figure 4:
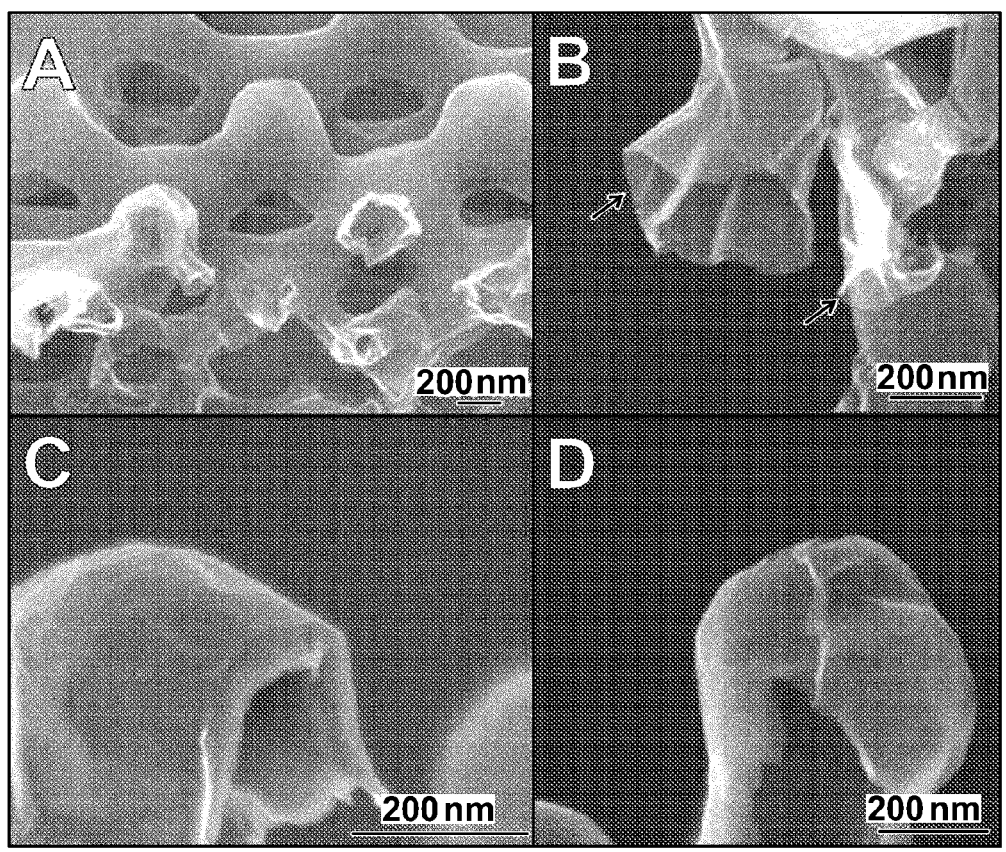
FIGS. 4A-4D are scanning electron micrographs of a three-dimensional multilayer graphene structure prepared by the processes illustrated by the preceding figures. As will be apparent from the figures, the structure included connecting arms best seen in FIGS. 4A and 4B and approximately spherical nodes best seen in FIGS. 4C and 4D.

The process described above is summarized in FIG. 3 through idealized graphical depictions of a portion of the carbon structure at various process stages. Specifically, the figure shows the following stages: (A) porous carbon, (B) conformal Ni coating, (C) diffusion of carbon into Ni top surface during thermal annealing, and (D) hollow three-dimensional graphene after etching away of the nickel.

Cross sectional imaging of the three-dimensional graphene structures by scanning electron micrography (SEM) is presented in FIGS. 4A-4D. Of particular note is that the structures appear to be hollow. It is well known that amorphous carbon can easily diffuse into nickel at elevated temperatures and concomitantly graphitize at the nickel surface. We therefore attribute the hollow nature of these structures to complete reordering of carbon at the nickel surface, or alternatively to incomplete diffusion of carbon atoms through the nickel, with sequestration of carbon atoms within the bulk of the nickel which is subsequently etched away.

Notably, x-ray photoionization spectra of these structures did not exhibit an $sp^3$ carbon signature. This implies that the cores of the structure are substantially free of residual, unconverted carbon, and is consistent with our visual observation that the cores are hollow.

It can be seen in the figures that the wall thickness varied from less than 5 nm at the connecting arms (FIGS. 4A, 4B) to approximately 20-30 nm at the spherical nodes (FIGS. 4C, 4D), although this approximation is difficult to quantify solely by SEM. However, Raman analysis confirmed the existence of two distinct regions having different ranges of thickness.

As mentioned above, we analyzed the graphene structure by x-ray photoelectron spectroscopy (XPS) and by Raman spectroscopy. The XPS analysis indicated a complete conversion of predominately $sp^3$ porous surface to $sp^2$ carbon. Raman spectroscopy was then used to determine the type of $sp^2$ carbon that was present, i.e., whether it was graphite, graphene, or vitreous carbon. The results of Raman imaging were most consistent with two interspersed regions respectively denominated $\alpha$ and $\beta$ having different morphologies. Our current interpretation of the results is that the $\alpha$ region consists of a twisted graphene multilayer of fewer than five monolayers thickness. We currently interpret the $\beta$ region as a multilayer stack containing more than five monolayers of graphene.

In order to assess the potential application of the three-dimensional graphene structures as electrodes, we investigated their electrochemical performance and compared them with the original amorphous porous carbon and with a glassy carbon electrode. In cyclic voltammetry of the well-known redox mediator potassium ferricyanide, the planar glassy carbon electrodes demonstrated a scan rate dependence on current, even for modest scan rates. For the three-dimensional graphene electrode, however, the steady-state diffusion controlled current was maintained up to a scan rate of about 100 mV/s, indicative of hemispherical diffusion and enhanced mass transport.

Results of our cyclic voltammetry also implied that more favorable electron transfer kinetics were occurring at the three-dimensional graphene electrodes than at the porous carbon electrodes. We attribute much of this behavior to the microscopically rough and crystalline graphene surface, which leads to a high density of surface states that can act as catalytic edge planes. We believe the presence of these catalytic planes, coupled with the higher electron conductivity associated with multilayer graphene relative to glassy carbon, combined to create an electrode with enhanced electron transfer processes and hence better electrochemical properties. These and other electrochemical results suggest that the multilayer graphene electrode may be advantageous for use as a fuel cell cathode, among other things.

Further details of the above studies may be found in X. Xiao et al., "Lithographically Defined Three dimensional Graphene Structures," *ACS Nano.* 6(4) (Apr. 24, 2012, Epub Mar. 22, 2012) 3573-3579, the entirety of which is hereby incorporated herein by reference.

EXAMPLE 2

Figure 5:
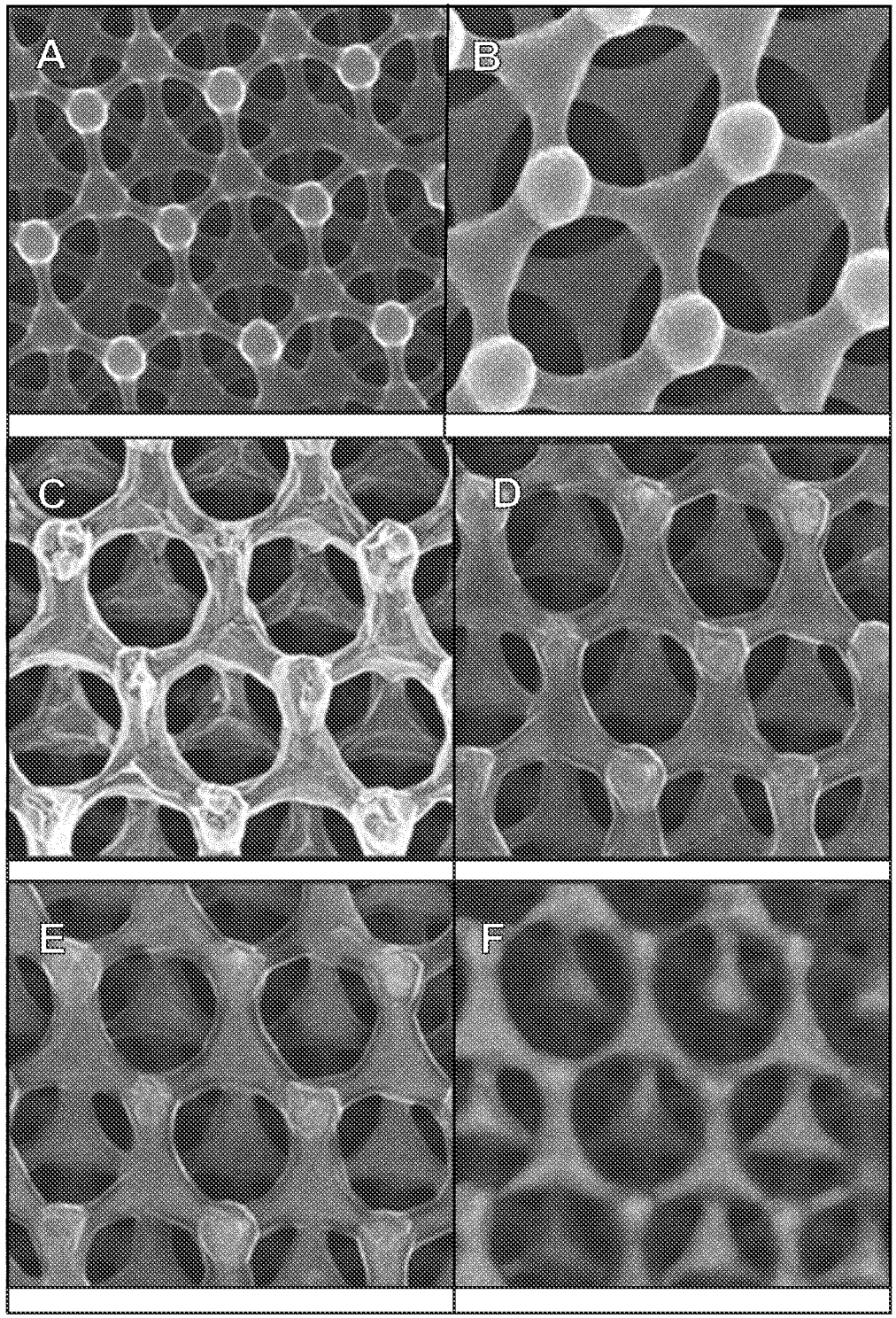
FIGS. 5A and 5B are scanning electron micrographs of, respectively, a pyrolyzed carbon pattern prior to sputtering and a similar pattern after nickel sputtering.
FIGS. 5C-5E are scanning electron micrographs, at different accelerating voltages, of a similar pattern after annealing.
FIG. 5F is a backscattered electron image of the pattern of FIGS. 5C-5E.

Carbon patterns were prepared substantially as described in Example 1. After pyrolysis, the films were placed in a standard sputtering chamber where nickel was sputtered at a rate of 0.7 Å per second for 2600 seconds to create a nominally conformal nickel shell around the carbon. FIG. 5A shows an SEM image of the pre-converted porous pyrolyzed photoresist film electrode. FIG. 5B shows an SEM secondary electron image of the structures after nickel sputtering. X-ray diffraction (XRD) indicated the existence of small 13-nm Ni crystallites after the sputtering process, and it further indicated that the carbon was in an amorphous state.

Graphene conversion was performed through a rapid thermal annealing process (750 C for 20 minutes in forming gas at 1 Torr). SEM images obtained using accelerating voltages of 1, 10, and 15 keV are respectively shown in FIGS. 5C-5E. An accelerating voltage of 15 kV was intense enough to provide the backscattered electron image shown in FIG. 5F. We interpret these images as indicating that the inner amorphous carbon had graphitized outside of the nickel, while the original nickel coating was completely encapsulated inside the new graphene shell as a solid core.

Raman analysis indicated the presence of multilayered graphene in the shell of graphitic carbon. X-ray diffraction indicated the presence of both graphite and metallic nickel (with approximately 18:82 weight percent respectively). X-ray photoelectron spectroscopy (XPS) indicated a better than 99% conversion from $sp^3$ to $sp^2$ carbon and less than 1% total mass due to nickel down to the XPS probing depth of several nanometers.

Thus, XPS indicated there was no substantial amount of nickel on the exterior of the structures, whereas the XRD and SEM measurements indicated a large nickel presence and an inner metallic core, respectively. We interpret this combination of results as confirmation that the carbon and nickel had become spatially separated and that they had completely switched their original orientations.

Figure 6:
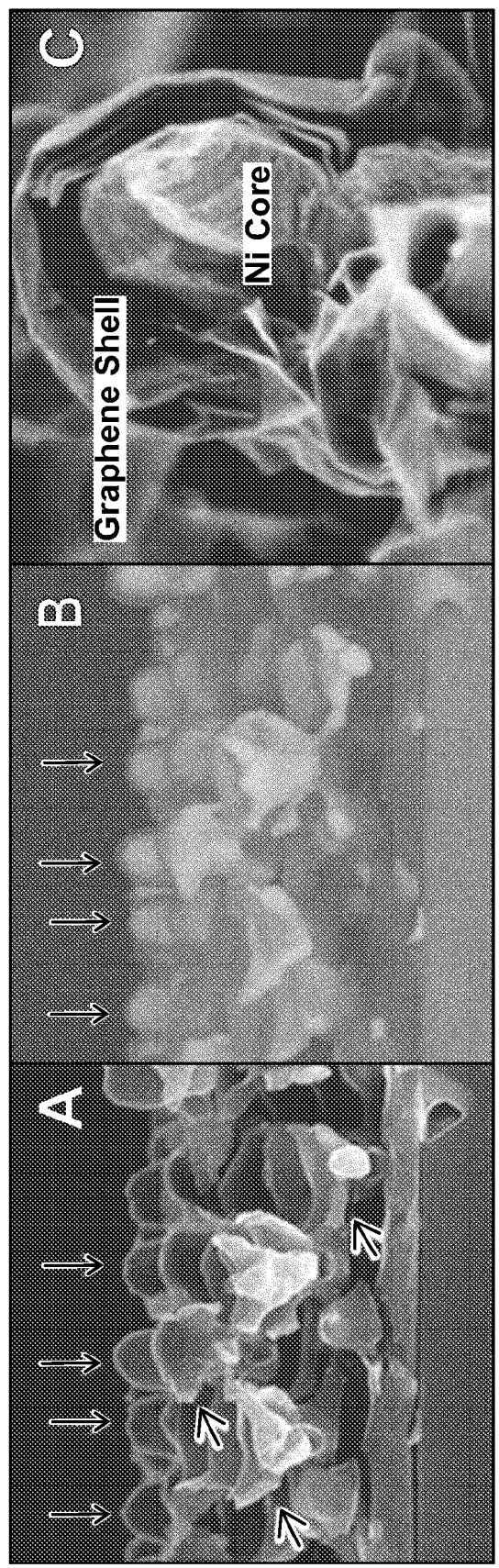
FIGS. 6A-6C are scanning electron micrographs of three-dimensional nickel-graphene core-shell structures.

The SEM cross sectional images shown in FIG. 6A show multiple areas (indicated by arrows) where nickel is protruding from broken graphene arms. The backscatter images shown in FIG. 6B show that this nickel interior pervades throughout the structures. Particularly striking upon comparison of FIGS. 6A-6C is the inner nickel core that exists inside the large domed nodes indicated by arrows in FIG. 6B and shown in cross section in FIG. 6C. If the original carbon structure had simply diffused and graphitized outside of the nickel then one would not have expected a solid nickel core as seen here. This suggests that the nickel shell had itself undergone a significant rearrangement.

Cyclic voltammetry of the graphene-nickel composite, conformed as an electrode in 0.5 Molar sodium hydroxide solution showed that the solution was able to reach and interact with the nickel cores, and it demonstrated favorable electron transfer kinetics at the nickel-electrolyte interface. Cyclic voltammetry of glucose oxidation at physiological concentrations in 0.5 Molar sodium hydroxide solution showed favorable kinetics, indicating that the nickel-encapsulated graphene electrodes could be advantageous for fast amperometric glucose sensing.

Our analytical results also suggested that these structures could have useful applications in microbatteries and biosensors, among other things.

Further details of the above studies may be found in X. Xiao et al., "Three dimensional nickel-graphene core-shell electrodes," *J. Mater. Chem*, 2012, 22, 23749-23754 (Dec. 7, 2012), the entirety of which is hereby incorporated herein by reference.

EXAMPLE 3

An array of suspended graphitic wires was made by using direct laser writing to three-dimensionally pattern a photopatternable medium, followed by nickel coating and pyrolysis as described above. The wires were several hundred nanometers in diameter and approximately 20 micrometers in length. Raman spectroscopy confirmed that the pattern was completely converted to graphite.

Figure 7:
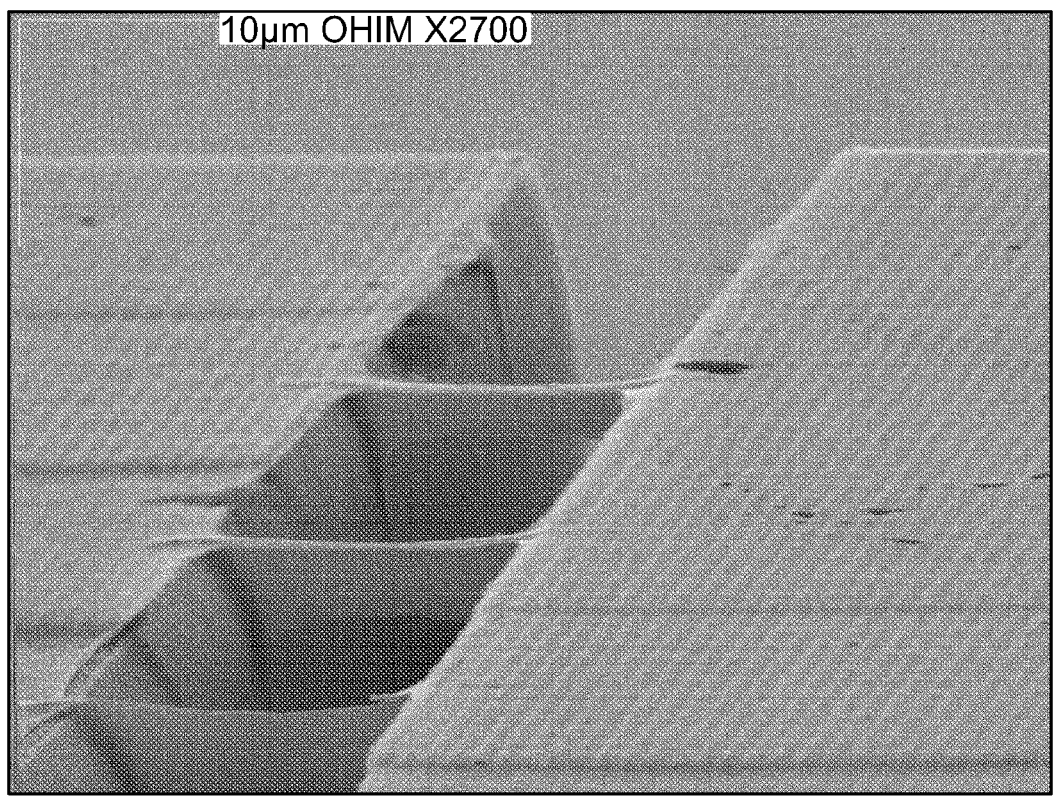
FIG. 7 is a micrograph of a stage in the creation of an array of suspended graphitic wires. Seen in the figure is a patterned body prior to pyrolysis.
Figure 9:
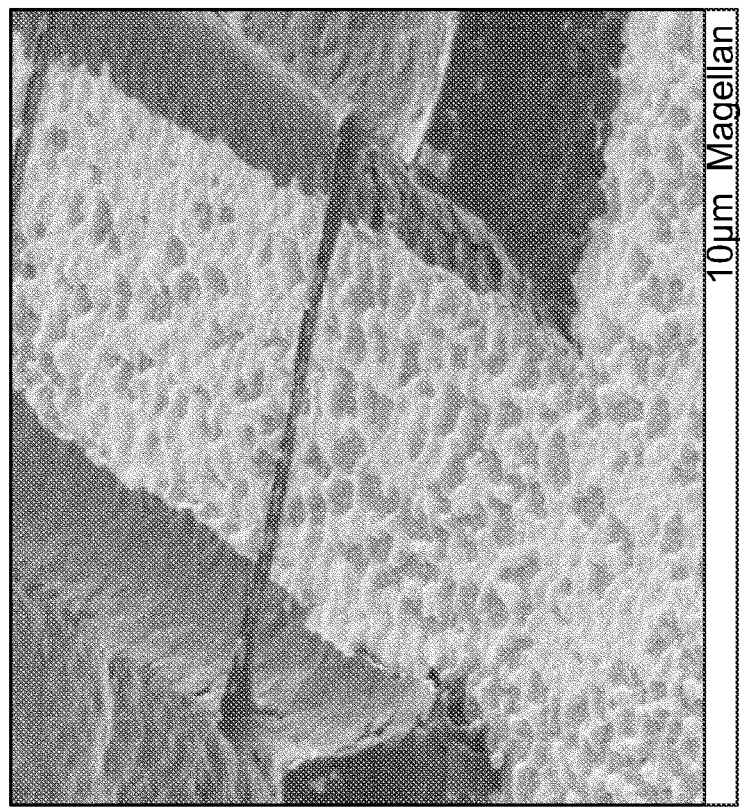
FIG. 9 shows a detail of FIG. 8 at higher magnification.
Figure 8:
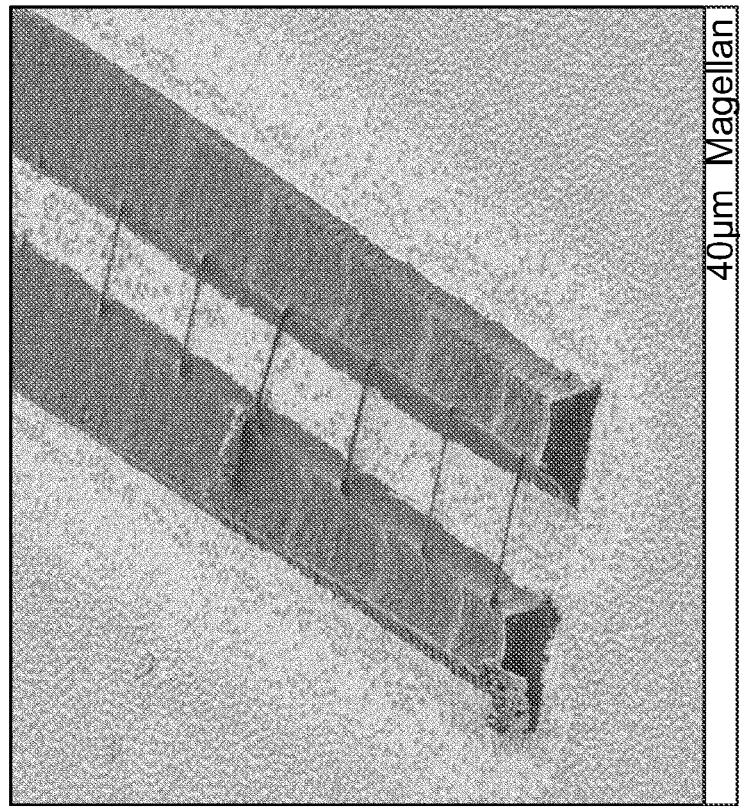
FIG. 8 provides a micrographic view of the patterned body of FIG. 7 after it has been pyrolized.

FIG. 7 provides a view of the pattern prior to pyrolysis. FIGS. 8 and 9 provide views of the graphitized structure. FIG. 9 provides a detail of FIG. 8 at higher magnification. The array of multiple suspended wires is best seen in FIG. 8. The detailed view of FIG. 9 clearly shows a wire suspended by its two ends.

The photopatterning was performed in a two-photon process using a femtosecond pulse infrared laser. The photopatternable material was SU8 photoresist. The two-photon process is a known process described, for example, in Hong-Bo Sun and Satoshi Kawata, "Two-Photon Photopolymerization and 3D Lithographic Microfabrication," in *NMR, 3D Analysis. Photopolymerization*, Advances in Polymer Science Series, Vol. 170, Springer-Verlag (2004), pp. 169-273.

We believe that using methods as described here, it will be possible to make wires of lengths at least five times, and as much as one hundred or more times, their diameters and of diameters that are one micrometer or less.

In fact, the use of stereolithographic two-photon photopolymerization, among other processes, enables the fabrication of carbonaceous patterns in a great variety of shapes, which can subsequently be pyrolyzed to graphene or graphite. In particular, discrete structures can readily be made by such processes. By "discrete structure" is meant a structure having a pattern that is localized in nature, and not a portion of a distributed repetitive pattern such as a two (or multiple) beam interference pattern. Moreover, as exemplified by the suspended wires described above, three-dimensionally patterned discrete graphene or graphitic structures can be made to include design features resolved to a dimension of one micrometer or less.

The invention claimed is:

1. A method, comprising:
providing a three-dimensionally patterned carbonaceous body;
coating the body with a catalytic metal whereby is formed a coating having an inner surface proximal the body and an outer surface distal the body; and
annealing the coated body to form a graphene or graphitic layer on the outer surface of the catalytic metal coating.

2. The method of claim 1, wherein the providing step comprises patterning a precursor body and pyrolyzing the patterned precursor body.

3. The method of claim 2, wherein the precursor body comprises a photoresist or photopatternable material and the patterning step is performed lithographically.

4. The method of claim 3, wherein the patterning step is performed by interference lithography so as to create an interconnected three-dimensional pattern in the photoresist.

5. The method of claim 3, wherein the patterning step is performed by direct laser writing.

6. The method of claim 1, further comprising etching away at least a portion of the catalytic metal coating.

7. The method of claim 1, wherein the catalytic metal comprises at least one of copper, nickel, and ruthenium.

8. A method for forming a three-dimensional graphene or graphitic structure, comprising:
three-dimensionally patterning a source of sacrificial carbon to correspond to a desired shape of the graphene or graphitic structure; and diffusing carbon from the source through a coating of catalytic metal deposited on a surface of the source.

\* \* \* \* \*